Nov. 7, 1950   J. K. MARSHALL ET AL   2,529,168
CONVEYER CHAIN
Filed Oct. 8, 1948   2 Sheets-Sheet 1
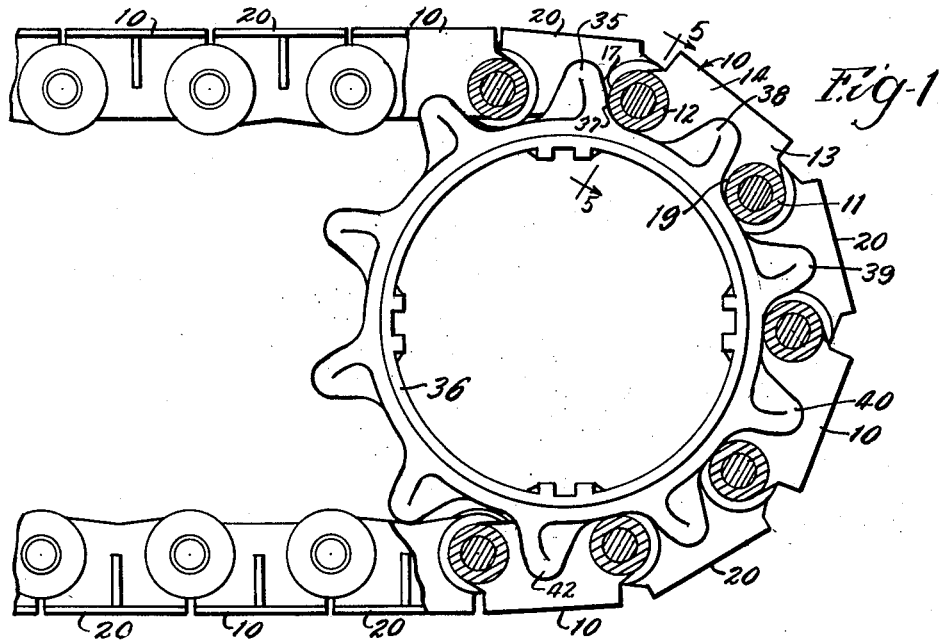
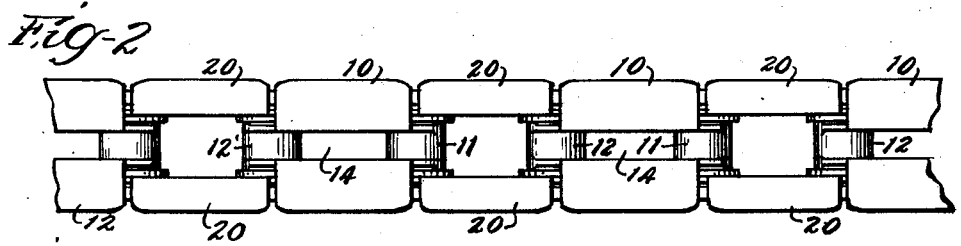
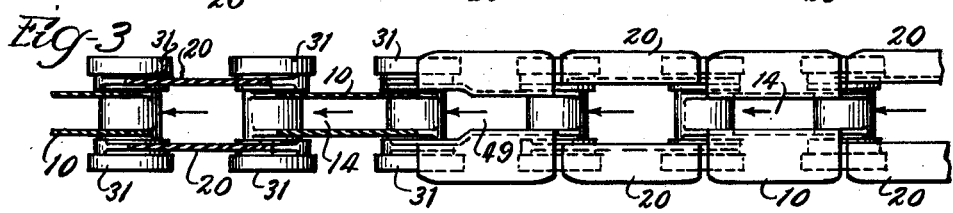
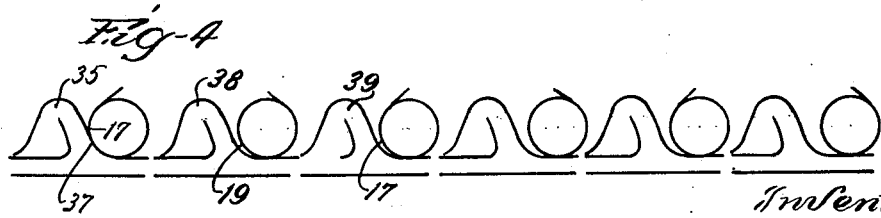
Inventors
Joseph K. Marshall &
Carl Nygren
By:- Mann & Brown Attys.

Nov. 7, 1950 J. K. MARSHALL ET AL 2,529,168
CONVEYER CHAIN
Filed Oct. 8, 1948 2 Sheets-Sheet 2
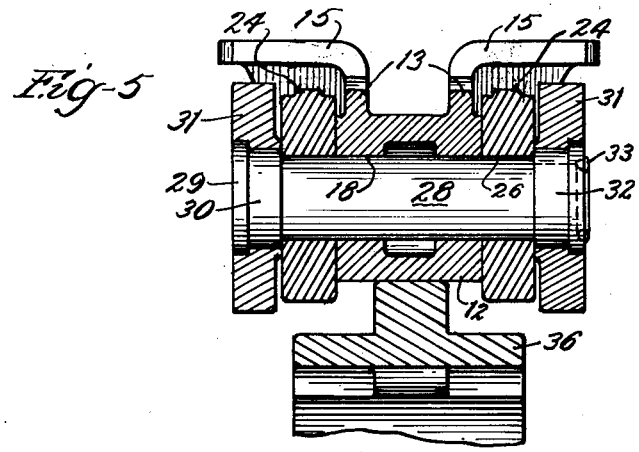
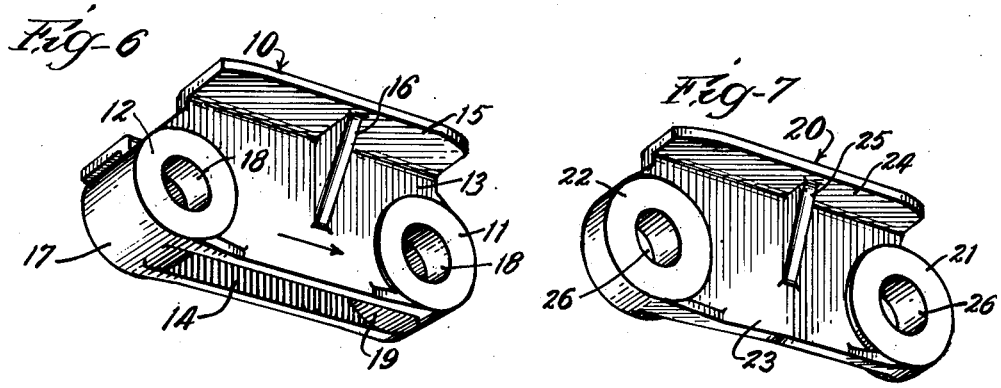
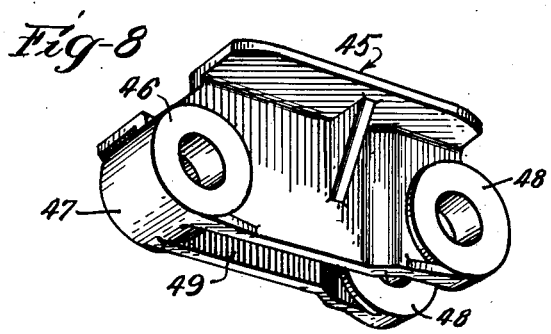
Inventors.
Joseph K. Marshall +
Carl Nygren
By:- Mann & Brown Attys.

Patented Nov. 7, 1950

2,529,168

UNITED STATES PATENT OFFICE 2,529,168

CONVEYER CHAIN

Joseph K. Marshall, Chesterton, and Carl Nygren, Michigan City, Ind., assignors to Michiana Products Corporation, a corporation of Indiana Application October 8, 1948, Serial No. 53,506

3 Claims. (Cl. 198—189)

Conveyor chains used in many heat treating furnaces are subject to high temperatures, often on the order of 1700 to 1800 degrees Fahrenheit, and frequently heating and cooling. For that reason, they are made of heat resisting alloy, and, because such alloys are costly to work, the conveyor chains are composed of cast links unmachined except at the joints. Unavoidable foundry variations, many times amounting to as much as 1/8", bring about unwanted contact between the links of the chain and the sprocket teeth that result in destructive wear and strain.

The principal object of this invention is to make all foundry variations of link dimensions ineffective, and to provide smooth and accurate working, otherwise obtainable only by machining so costly as to be prohibitive.

Generally speaking, this is accomplished by making the chains of center links (which alone take the drive) having a pitch greater than the pitch of the driving sprocket and connecting those center links with side links having a pitch shorter than the pitch of the sprocket, and boring the pin holes in the center links in a fixture that insures accuracy with respect to the surface for contact with the sprocket teeth.

Other objects and advantages of the invention will appear as the disclosure proceeds and the description is read in connection with the accompanying drawings, in which Fig. 1 is a diagrammatic representation of a portion of a conveyor chain and a driving sprocket;

Fig. 2 is a plan view of a length of conveyor chain;

Fig. 3 is a similar plan view of a length of conveyor chain shortened to account for stretch;

Fig. 4 is a diagrammatic representation of the teeth of the driving sprocket and adjacent portions of center links shown in straight line relation;

Fig. 5 is a transverse section on the line 5—5 of Fig. 1;

Fig. 6 is a perspective view of one of the center links;

Fig. 7 is a perspective view of one of the side links, two of which make up a link between adjacent center links; and Fig. 8 is a perspective view of a change-over or take-up link used in shortening the chain to correct for stretch.

Each center link 10, shown in Fig. 6, is composed of cylindrical end portions 11 and 12 connected by spaced side portions 13, providing a tooth space or socket 14 between the cylindrical portions 11 and 12 and having out-turned flanges 15 braced by gussets 16 and forming the actual work support.

The rounded surface 17 of the cylindrical portion 12 of each center link is in working contact with teeth of the driving sprocket. By placing that surface 17 against a suitable datum in a jig or fixture and boring the pin openings 18 at the appropriate distance with respect to each other and respect to that surface 17, the pitch of that link is made accurate, notwithstanding any foundry variations, and the distance between that surface 17 and the similar but idle surface 19 on the inside of the center link at the opposite end is such as to clear the tooth of the sprocket adjacent to that which is in contact with the surface 17 in driving the chain.

Each side link 20, shown in Fig. 7, is composed of cylindrical portions 21 and 22 connected by a web or body 23 having an out-turned flange 24 braced by a gusset 25. Each of the cylindrical portions 21 and 22 is provided with a bored or drilled pin opening 26. Two side links, such as shown in Fig. 7, make up a connecting link between two adjacent center links, shown in Fig. 6.

The center and side links are articulated by pins 28 extending through the bores 18 and 26, as shown in Fig. 5. The head 29 of each pin 28 has a bearing 30 for a roller 31, and a bushing 32 welded to the opposite end of the pin at 33 provides a similar bearing for another roller 31, the rollers being on the outside of the links and having a diameter suitable for giving the chain support in its travel between sprockets.

In one embodiment of the invention that has been found satisfactory in practice, each center link 10 has a pitch, or a distance between centers of the pins 28, of 6 1/8", and each side link has a pitch of 5 7/8". The driving sprocket for the chain composed of those links has a pitch of 5 15/16".

The pitch of the sprocket is shorter than the pitch of the center link and longer than the pitch of the side links. Twice the pitch of the sprocket, 11 7/8", is shorter than the sum of the pitches of the center and side links, which is 12".

The rounded surface 17 takes all the drive of the sprocket, and it is the only surface that receives the thrust of the sprocket tooth. By the relation of pitches and boring the pin holes 18 in a fixture having a datum line against the surface 17, each pitch line is definitely related to that surface 17. Each twelve inches of chain link is made accurate, and the surfaces 17 and 19 are so spaced that there can be no binding between the teeth and the links of the sprocket chain.

The static relation is represented in Fig. 1, where a tooth 35 on the driving sprocket 36 is in driving contact with the curved surface 17 of the adjacent link 10, as indicated at 37. The next adjacent tooth 38 is received in the space or socket 14 between the side pieces 13 of the link 10, and is spaced from the curved surface 19 on the inner side of the cylindrical portion 11 approximately $\frac{3}{16}''$. Thus, a foundry variation of $\frac{1}{8}''$ is accomodated with the one-sixteenth of an inch clearance.

The next adjacent driving tooth 39 to the right is spaced from the adjacent surface 17 by approximately $\frac{1}{8}''$.

The next adjacent idle tooth 40 is spaced from the adjacent curved surface 19 approximately $\frac{5}{16}''$, etc., until the idle tooth 42, which is about to leave the lower portion of the chain, is spaced from the adjacent curved surface 19 approximately $\frac{7}{16}''$.

With this arrangement, one tooth at a time transmits the driving force to the conveyor chain through the adjacent surface 17 on one center link. As it takes the load, its predecessor in that office is relieved, and all other teeth of the sprocket are spaced from the adjacent surfaces. In particular, the idle teeth are spaced from the surfaces 19 far enough to prevent any possible binding between the idle tooth and those surfaces.

Heretofore, in standard chain designs for furnace conveyor chains, the front or pitch face of the idle teeth have wedged against the surfaces corresponding to 19, putting enormous strains on the center links, tending to stretch them, grinding the sprockets, and forming a binding relation, which resulted in the chain actually being lifted at the bottom of the sprocket instead of falling away as it should and as is illustrated in Fig. 1.

In Fig. 4, the relation between the driving tooth 35, the adjacent surface 17 on the center link 10, the idle tooth 38, the adjacent surface 19, the next driving tooth 39, and the adjacent surface 17 are represented in straight line relation to make the clearances stand out. Actually, when the chain is bent around the sprocket, there is some variation, but the clearances are still on the order of those indicated. There is always an increasing clearance between the front or pitch face of the sprocket teeth and the adjacent surface of the center link as the distance from the driving contact of the one tooth represented by 35 increases.

The importance of relieving the strain produced by binding against the surfaces 19 will become more clear when it is borne in mind that an alloy suitable for operation at temperatures on the order of 1700 degrees and having a tensile strength of 60,000 pounds cold should not be stressed over 750 pounds at the extreme temperature. Chains of standard design for this service may be expected to last four months, and they cost many thousands of dollars.

All chains in conveyors for high temperature furnaces stretch in service and eventually become so slack that correction must be made. Ordinarily, that is done by taking out one link of a chain to shorten it. With the present arrangement, taking out one link of a chain would result in difficulty in joining the two adjacent links, and, to get around that difficulty, a change-over or take-up link 45, shown in Fig. 8, is provided. It includes a cylindrical portion 46 corresponding to the cylindrical portion 12 in Fig. 6, and having a driving surface 47 corresponding to the driving surface 17 in Fig. 6. It also includes two cylindrical portions 48 corresponding to the cylindrical portions 21 in Fig. 7, and spaced apart to correspond with two of those portions on a pair of side links. There is also an intermediate socket or space 49 corresponding to 14 in Fig. 6. The other features of the change-over link will be clear from the drawings without further description.

With such a link, slack may be taken up by using it to replace one center link 10 and two side links 20, and connecting the cylindrical portions 48 to the adjacent cylindrical portion 12 of the center link and the cylindrical portion 46 with the adjacent cylindrical portions 21 of two side links by pins 28. This is shown in Fig. 3.

The change-over or take-up link 45 in the embodiment mentioned has a pitch of 6", or one-half the sum of the pitches of the links 10 and 20, with which it is to be used.

The arrow heads on Fig. 3 show the driving contact in the relevant portion of the shortened chain, from which it will be noted that the drive is communicated to the rounded portion 47 of the take-up link 45, and also the rounded portion 17 of the link 10, to which it is connected. Thus, adjacent links will take the drive in the shortened chain.

With the sprocket having an even number of teeth, the effect would be to cause a shift over to the alternate teeth, which had not been previously driving, or, as they have been called, idle.

But in case of a sprocket with an odd number of teeth, there would be little difference, since each revolution of the sprocket would cause a shift over from one set of teeth to another.

We claim:

1. A conveyor chain for use with a conventional sprocket of uniform pitch, said chain comprising cast center links and cast side links, said center and side links alternating in sequence and being articulated together, the pitch of the center links being greater than that of the side links and the sum of the pitches of a pair of consecutive links being greater twice the pitch of the sprocket.

2. In a heat treating furnace, a chain conveyor including a driving sprocket of uniform pitch, and a chain composed of center links and side links articulated together with the teeth of the sprocket driving the chain by pressure contact with the back of the center links only, the pitch of the sprocket being shorter than the pitch of the center link and longer than the pitch of the side links.

3. In a heat treating furnace, a chain conveyor including a driving sprocket having uniform pitch, and a chain composed of center links and side links articulated together with the teeth of the sprocket driving the chain by pressure contact with the back of the center links only, the pitch of the sprocket being shorter than the pitch of the center link and longer than the pitch of the side links, and the sum of the pitches of the center and side links being greater than double the pitch of the sprocket.

JOSEPH K. MARSHALL.
CARL NYGREN.

REFERENCES CITED

The following references are of record in the file of this patent:

UNITED STATES PATENTS

| Number | Name | Date |
| --- | --- | --- |
| 1,845,127 | Clark | Feb. 6, 1932 |